United States Patent
Cho

[11] Patent Number: 5,815,361
[45] Date of Patent: Sep. 29, 1998

[54] MAGNETIC FIELD SHIELDING DEVICE IN DISPLAY

[75] Inventor: Sung-Yun Cho, Suwon, Rep. of Korea

[73] Assignee: SamSung Electronics Co., Ltd., Suwon, Rep. of Korea

[21] Appl. No.: 835,056

[22] Filed: Apr. 3, 1997

[30] Foreign Application Priority Data

Apr. 3, 1995 [KR] Rep. of Korea ................. 1996-10047
Jan. 3, 1997 [KR] Rep. of Korea ....................... 1997-27

[51] Int. Cl.[6] ....................................................... H01F 13/00
[52] U.S. Cl. ............................. 361/150; 361/149; 361/267
[58] Field of Search ................................... 361/150, 149, 361/267, 151; 315/8

[56] References Cited

U.S. PATENT DOCUMENTS

| | | | |
|---|---|---|---|
| 3,614,519 | 10/1971 | Figlewicz et al. | 313/85 |
| 3,872,347 | 3/1975 | Matsushima et al. | 361/150 |
| 4,709,220 | 11/1987 | Sakane et al. | 335/214 |
| 4,940,920 | 7/1990 | Giannantonio et al. | 315/8 |
| 5,170,094 | 12/1992 | Giannantonio et al. | 313/431 |
| 5,200,673 | 4/1993 | Hishiki | 315/370 |
| 5,416,595 | 5/1995 | Wield | 348/825 |
| 5,559,401 | 9/1996 | De Wit | 315/8 |

Primary Examiner—Jeffrey A. Gaffin
Assistant Examiner—Kim Huynh
Attorney, Agent, or Firm—Robert E. Bushnell, Esq.

[57] ABSTRACT

A magnetic field shielding device of a CRT (cathode ray tube) display includes a degaussing coil for preventing a magnetic field, generated by a voltage supplied to a deflection coil of the display, from being emitted from the display. A tilt coil maybe disposed at the middle portion of the degaussing coil so as to surround an electron gun of the cathode ray tube. The top and bottom portions of the degaussing coil are arranged so as to be horizontal. Both sides of the middle portion of the degaussing coil are bent inward so as to approach to each other, and so as to have a predetermined distance therebetween. The shielding device prevents dark color purity from being generated at the lower portion of the display.

3 Claims, 7 Drawing Sheets

MAGNETIC FIELD SHIELDING DEVICE IN DISPLAY

CLAIM OF PRIORITY

This application makes reference to, incorporates the same herein, and claims all benefits accruing under 35 U.S.C. §119 from an application for MAGNETIC FIELD SHIELDING DEVICE IN DISPLAY earlier filed in the Korean Industrial Property Office on 3 Apr. 1996 and there duly assigned Ser. No. 10047/1996, and from an application for MAGNETIC FIELD SHIELDING DEVICE IN DISPLAY earlier filed in the Korean Industrial Property Office on 3 Jan. 1997 and there duly assigned Ser. No. 27/1997.

BACKGROUND OF THE INVENTION

1. Field of the Invention

The present invention relates to a display and, more particularly, to a magnetic field shielding device in a display, which shields a secondary magnetic field generated when a magnetic field generated by the deflection yoke and tilt coil of a cathode ray tube (CRT) affects a degaussing coil, to thereby satisfy the MPR II standard.

2. Description of the Related Art

Conventionally, a display a peripheral device for a computer exhibits a varying visual representation of signal received from a computer as a picture in the form of an image that a user can recognize. In this display, the picture is formed by controlling the deflection of an electron beam of a cathode ray tube as the beam is projected onto a fluorescent screen. A deflection circuit controls changes in the defection of the electron beam. The deflection used in the deflection circuit may be an electrostatic deflection using an electric field or, alternatively, an electromagnetic deflection using a magnetic field.

The magnetic field is formed due to a voltage supplied to a deflection yoke of the cathode ray tube and the electric field is formed by a high voltage supplied to an anode of the cathode ray tube. It has been suggested that if these electric and magnetic fields are emitted from the display, the fields may exert harmful influence on a human body. As consumers take a growing interest in hazardous electronic waves generated by electronic products, an EMI test suitable for the EM standard has been provided in countries manufacturing electronic products. Such a standard restricts the intensities of electric and magnetic fields in order to minimize the risk of harming a user's health due to the video display terminal syndrome. This restricts the intensities of electric and magnetic fields in an electronic tube of displays using electronic tube.

The magnetic field can be shielded by a magnetic field shielding coil separately set on a correction and deflection yoke of the deflection yoke attached to the cathode ray tube. This magnetic field shielding coil is called a degaussing coil.

The degaussing coil is normally formed either in a rectangular shape for smaller displays or in an X shape with the top and bottom of the X being closed for larger displays (e.g., greater than 17 inches in nominal screen with). Furthermore, a tilt coil is provided to compensate for the tilt of the electron beam due to the magnetic field. The tilt coil is normally disposed so as to surround an electron gun of the cathode ray tube.

The degaussing coil performs degaussing of the magnetic field formed in the cathode ray tube when power is supplied. Furthermore, the degaussing coil returns the cathode ray tube to its original color state from the state where a color of the cathode ray tube spreads due to the earth's magnetism or external conditions. The degaussing coil is operated before power is supplied to the circuits during the display after power is supplied to the display. That is, current is instantaneously supplied degaussing coil for 2 to 8 seconds to thereby degauss the cathode ray tube. Moreover, the degaussing coil prevents the magnetic field generated by a voltage supplied to the deflection yoke of the display from being emitted from the display.

When the degaussing coil and tilt coil are disposed however, the color of the cathode ray tube slightly spreads at a lower portion even if degaussing is performed because the magnetic field is not perfectly degaussed when the magnetic field at the crossed portion where the degaussing coil is twisted is stronger. The magnetic force is crossed at the twisted portion to thereby produce doubled magnetism and accordingly, a shadow mask of the cathode ray tube is strongly polarized and thus degaussing is not performed well. As a result, color purity is generated at the lower portion of the cathode ray tube. The magnetic fields generated by the deflection yoke and tilt coil of the electron tube are combined to thereby form a stronger magnetic field. This is the reason why the color purity is degraded. The magnetic field which is not degaussed has a harmful influence on the viewer of the display.

SUMMARY OF THE INVENTION

An object of the present invention is to provide an improved process and device for shielding magnetic fields.

It is another object to provide a magnetic field shielding device in a cathode ray tube display having a degaussing coil that is set in a predetermined form to prevent a secondary magnetic field from being generated, so that magnetic field generated by a deflection yoke and tilt coil of the cathode ray tube does not affect the degaussing coil, to thereby satisfy the MPR II standard without using a metal shield.

To accomplish these and other objects of the present invention, there is provided a magnetic field shielding device of a CRT (cathode ray tube) display, includes a degaussing coil for preventing a magnetic field, generated by a voltage supplied to a deflection coil of the display, from being emitted from the display, and a tilt coil fixed at the middle portion of the degaussing coil so as to surround an electron gun of the cathode ray tube, the top and bottom of the degaussing coil being maintained horizontal, and both sides of its middle portion being bent inward to approach to each other, and having a predetermined distance therebetween, to thereby prevent dark color purity generated at the lower portion of the display.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
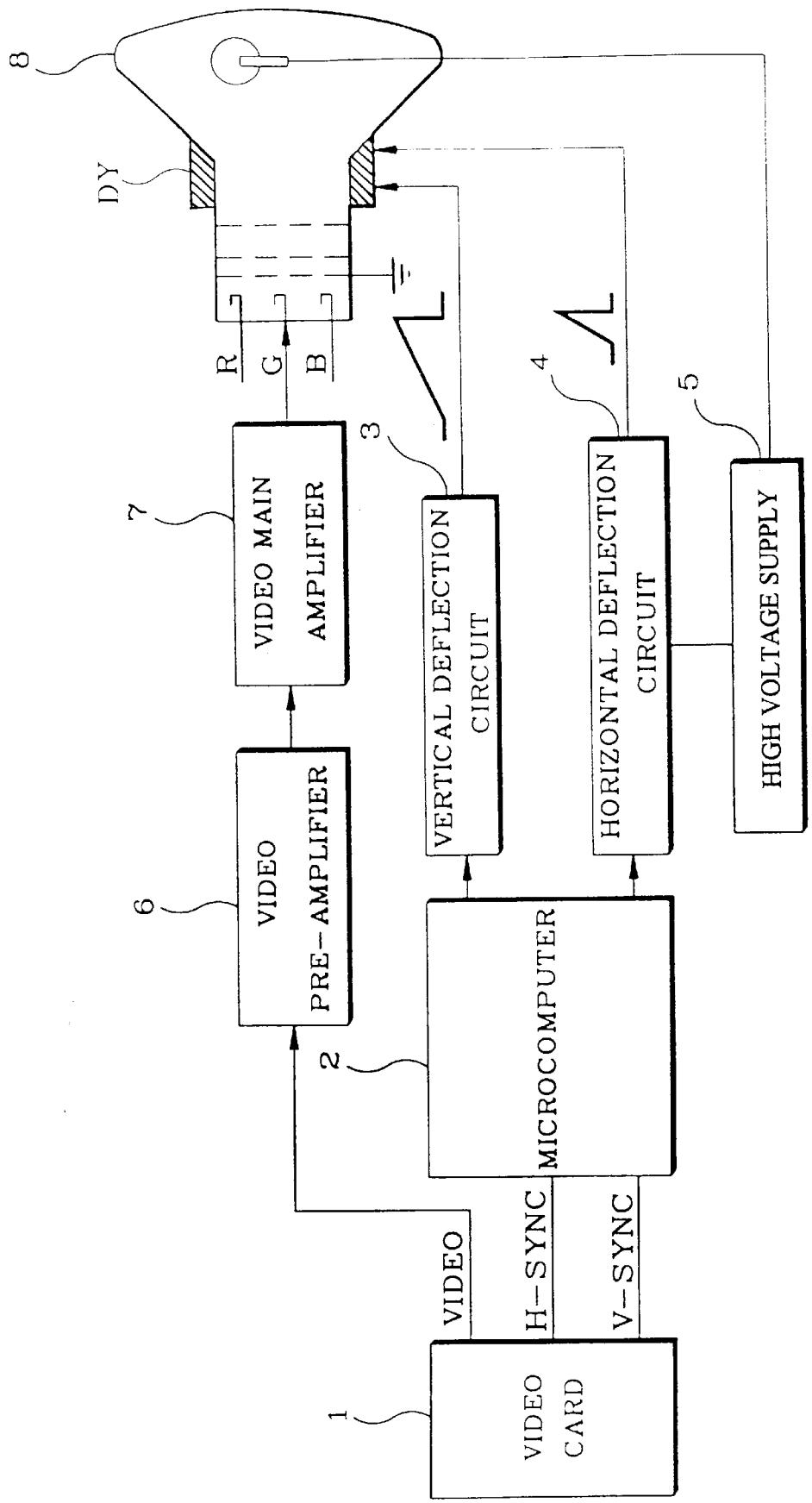
FIG. 1 is a block diagram of a display.

A monitor is a peripheral device of a computer, which exhibits a varying visual display of a signal received from a computer as a picture, so that a user can recognize it. FIG. 1 is a block diagram of a display. Referring to FIG. 1, the display includes a microcomputer 2 for receiving a video signal (R,G,B), and horizontal and vertical synchronization signals H-Sync and V-Sync required for forming a picture, from a video card 1 contained within a computer (not shown), and for generating a control signal for controlling a monitor picture, and vertical and horizontal deflection circuits 3 and 4 for receiving the horizontal and vertical synchronization signals, and performing horizontal and vertical deflections so that an electron beam generated by an electron gun of a cathode ray tube 8 is sequentially deflected from the upper left portion of the cathode ray tube 8 to its lower right portion by a defection yoke, to thereby form a picture. The display also includes a high voltage supply 5 for supplying a high voltage to the anode of the cathode ray tube 8 using a retrace line pulse generated by the output of the horizontal deflection circuit 4, a video pre-amplifier 6 for amplifying a low level of video signal (R,G,B) transmitted from the video card 1 using a low-voltage amplifier, to thereby maintain a predetermined voltage level, and a video main amplifier 7 for amplifying the voltage amplified by the video pre-amplifier 6 to a signal of 40 to 60 Vpp, and for supplying energy to each pixel of the display.

In this display, the picture is formed through the electron beam projected onto its fluorescent screen. The deflection circuit changes the deflection of the electron beam. The deflection used in the deflection circuit may be an electrostatic deflection using an electric field, or an electromagnetic deflection using a magnetic field. In the case of television, electromagnetic deflection is used, and a current of a sawtooth waveform flows through its horizontal and vertical deflection yokes to form a picture. This method uses the fact that a magnetizing force forming a magnetic field is generated when current flows through a coil.

The magnetic field is formed due to a voltage supplied to the deflection yoke, and the electric field is formed by a high voltage supplied to the anode of the cathode ray tube. If these electric and magnetic fields are emitted from the display, these may exert harmful influence on a human body. As consumers take a growing interest in the hazardous risks associated with electronic waves generated by electronic products, an EMI test suitable for the EMI standard has been provided in countries manufacturing electronic products. The EMI standard specifies a clock noise in a frequency band of 30 MHz to 1 GRz. The MPR II standard has been set by a representative European regulation organization for testing and measuring the hazardous electronic waves. The MPR I standard was launched in Sweden in 1987, and then the MPR II standard which has further tightened requirements was set in 1990. The MPR II standard restricts the intensities of electric and magnetic fields in order to minimize dangers of harming a user's health due to the video display terminal (VDT) syndrome. Especially, this restricts the intensities of electric and magnetic fields in an electronic tube of displays using the electronic tube. The MPR II specifies limitations in the electric and magnetic fields shown in the following Table 1.

TABLE 1

| Parameter | Frequency band | Limitation | Remarks |
|---|---|---|---|
| Electric field | ELF (5 Hz–2 KHz) | 25 V/M | ELF: Extremely Low Frequency |
| | VLF (2 KHz–400 KHz) | 2.5 V/M | |
| Magnetic field | ELF (5 Hz–2 KHz) | 200 nT | VLF: Very Low Frequency |
| | VLF (2 KHz–400 KHz) | 25 nT | |

Figure 2A:
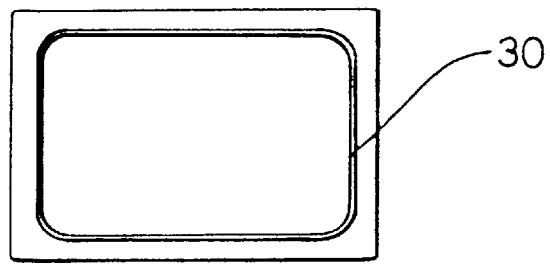
FIGS. 2A and 2B show states where a degaussing coil of the display is set in different ways.
Figure 2B:
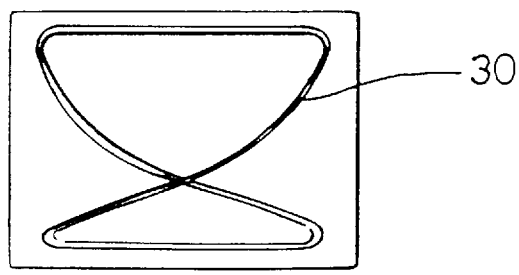

The magnetic field is generated due to the voltage supplied to the deflection yoke, and the electric field is due to the voltage supplied to the anode of the cathode ray tube. The magnetic field can be shielded by a magnetic field shielding coil separately set on a correction and deflection yoke of the deflection yoke attached to the electron gun. This magnetic field shielding coil is called a degaussing coil. FIGS. 2A and 2B show degaussing coils in different forms, which are widely used. FIG. 2A shows the form of degaussing coil used in a 14" or 15" monitor, and FIG. 2B shows the form of degaussing coil used in monitors which are 17" or more. Each monitor requires the degaussing capability of the degaussing coil, depending on the forms of degaussing coils shown in FIGS. 2A and 2B. The details are shown in the following table. In table 2, A-type indicates the degaussing coil of FIG. 2A, and B-type indicates the degaussing coil of FIG. 2B.

TABLE 2

| Classification | | 14' | 15' | 17' | 20' |
|---|---|---|---|---|---|
| Toshiba | A-type | 500 | 600 | | |
| | B-type | | | 1000 | 2000 |
| Hitachi | A-type | | 1000 | 1000 | |
| | B-type | | | | 1600 |
| SDD | A-type | 1000 | 1200 | 1600 | |
| | B-type | | | 800 | |

As shown in Table 2, the degaussing capability required for 17" and 20" monitors is higher than that of 14" and 15" monitors. The B-type degaussing coil whose middle portion is twisted once, as shown in FIG. 2B, has excellent degaussing capability.

Figure 3:
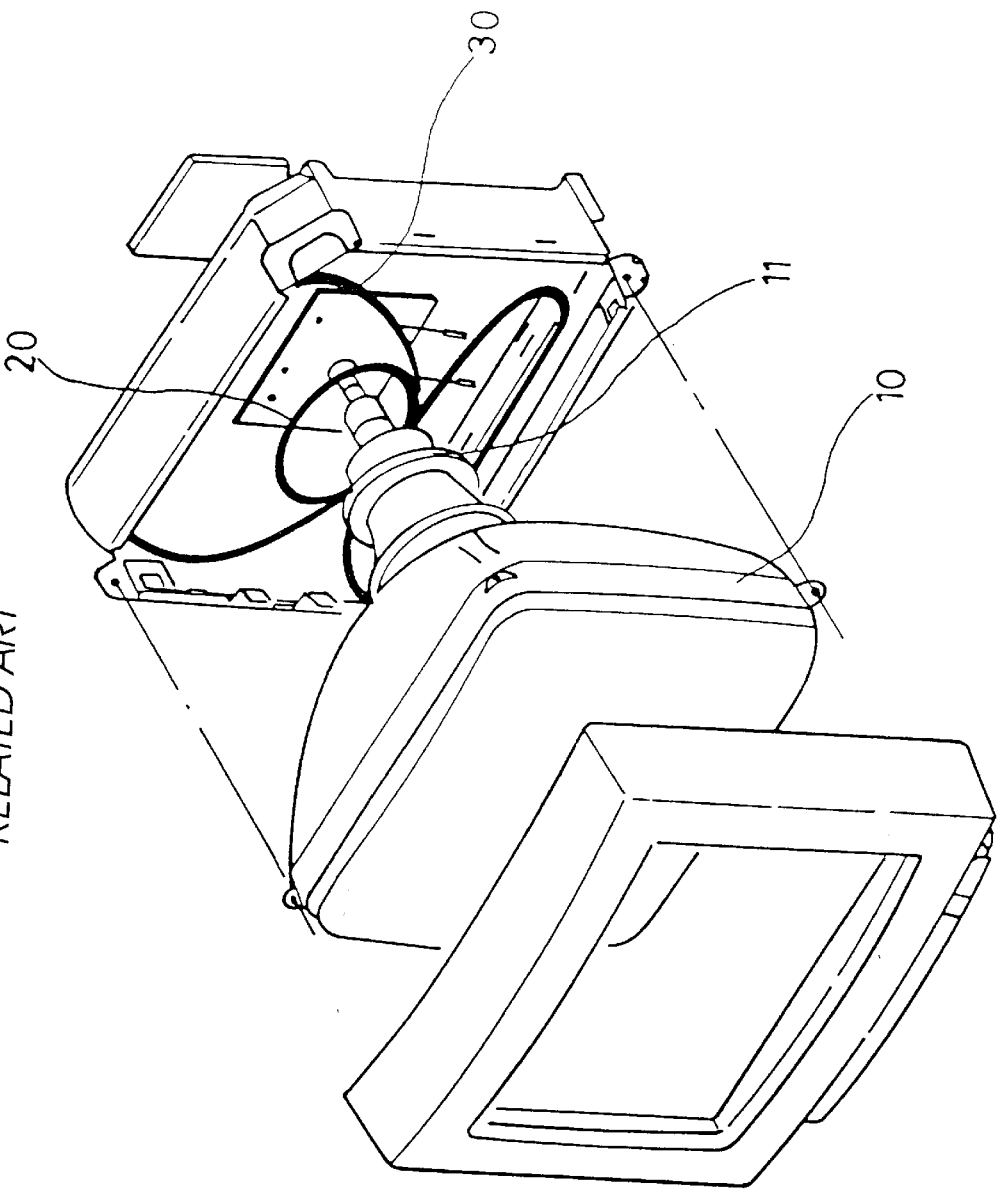
FIG. 3 is an exploded perspective view of the display in which the degaussing coil is set.
Figure 4:
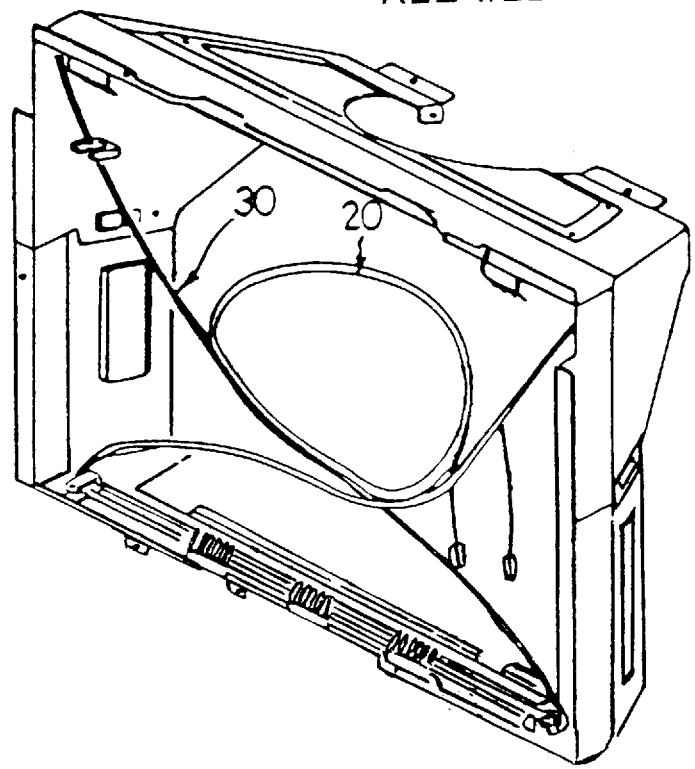
FIG. 4 shows a portion of the display of FIG. 3 in detail.

FIG. 3 is an exploded perspective view of a display including a tilt coil and the degaussing coil shown in FIG. 2B, and FIG. 4 shows the portion where the tilt coil and degaussing coil of FIG. 3 are set in detail. FIGS. 3 and 4 show states where the tilt coil and degaussing coil are used. Referring to FIG. 3, tilt coil 20 and degaussing coil 30 surrounding an electron gun 11 of a cathode ray tube 10 are located on the back case of the display. Referring to FIG. 4, the form of degaussing coil 30 is maintained by catches set on the top and bottom of the back case. Tilt coil 20 in circular form surrounds the electron gun. Here, the middle portion of degaussing coil 30 is twisted once as shown in FIG. 5.

The tilt coil 20 compensates for an electron beam's tilt due to the magnetic field. The degaussing coil 30 performs degaussing of the magnetic field formed in the cathode ray tube when power is supplied. Furthermore, the degaussing coil 30 returns the cathode ray tube to its original color state from the state where a color of the cathode ray tube spreads due to the earth's magnetism or external conditions. The degaussing coil is operated before power is supplied to circuits of the display after power is supplied to the display. That is, current is instantaneously supplied to the degaussing coil for 2–8 seconds, to thereby degauss the cathode ray tube. Moreover, the degaussing coil prevents the magnetic field generated by a voltage supplied to the deflection yoke of the display from being emitted from the display.

Figure 5:
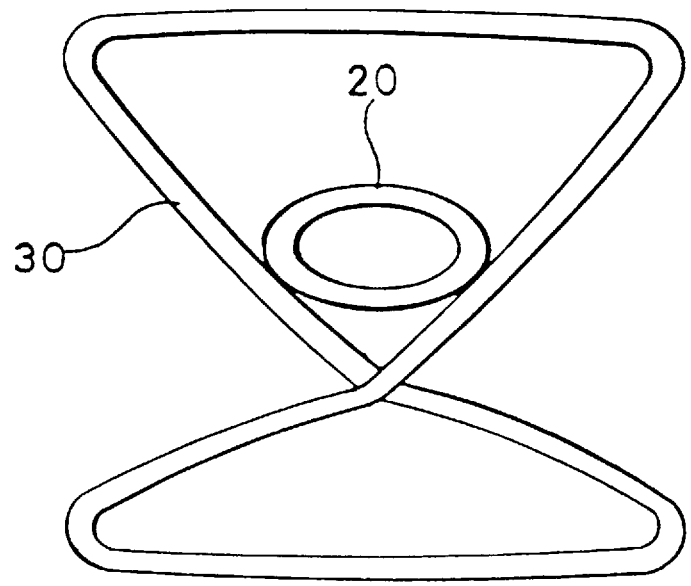
FIG. 5 shows the degaussing coil of the display of FIGS. 3 and 4 in detail.

When degaussing coil 30 and tilt coil 20 are set in the form shown in FIGS. 3 and 5 however, the color of the cathode ray tube slightly spreads at its lower portion even if degaussing is performed. This is because the magnetic field is not perfectly degaussed when the magnetic field at the portion where the degaussing coil is twisted is stronger. The magnetic force is crossed at the twisted portion, to thereby produce doubled magnetism. Accordingly, a shadow mask of the cathode ray tube is strongly polarized, and thus degaussing is not performed well. As a result, color purity is generated at the lower portion of the cathode ray tube. The magnetic fields generated by the deflection yoke and tilt coil of the electron tube are combined, to thereby form a stronger magnetic field. This is the reason why the color purity is generated. The magnetic field which is not degaussed has a harmful influence on the display user.

Figure 6:
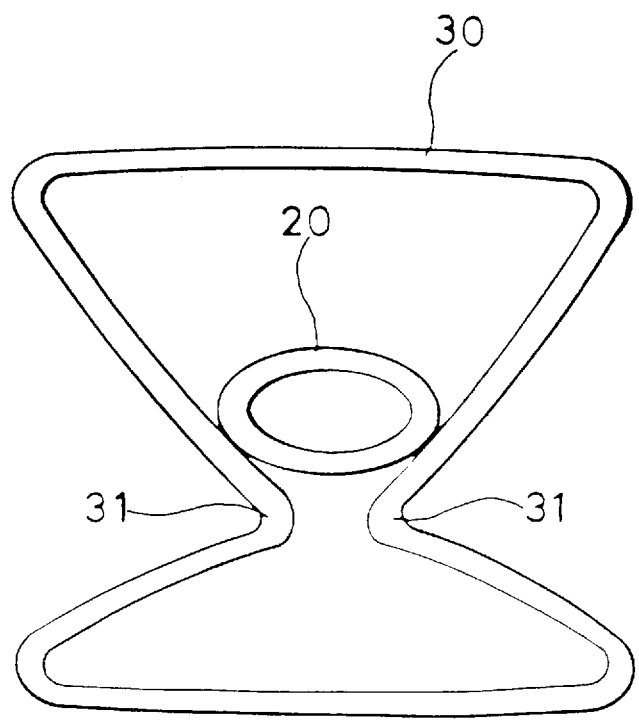
FIG. 6 shows the form of a degaussing coil according to the present invention in detail.

Reference will now be made in detail to the preferred embodiment of the present invention, examples of which are illustrated in the accompanying drawings. FIG. 6 shows the form of a degaussing coil according to the present invention. Referring to FIG. 6, a magnetic field shielding device of a display according to the present invention is constructed in such a manner that the top and bottom of degaussing coil 30 are maintained horizontal, both sides of its middle portion are bent inward to approach to each other having a predetermined interval, and a tilt coil 20 surrounding an electron gun is set at the middle portion of the degaussing coil and united with it.

Figure 7:
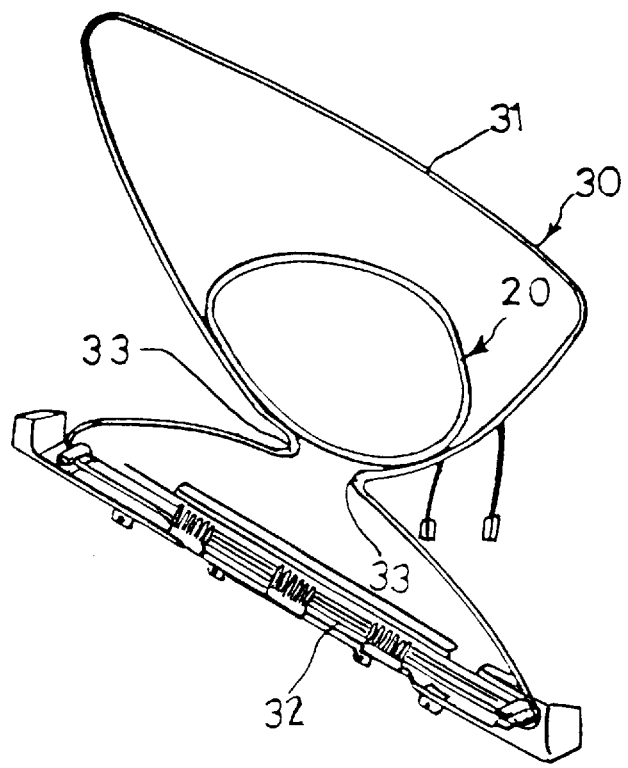
FIG. 7 shows a state where the degaussing coil is set in a display according to the present invention.
Figure 8:
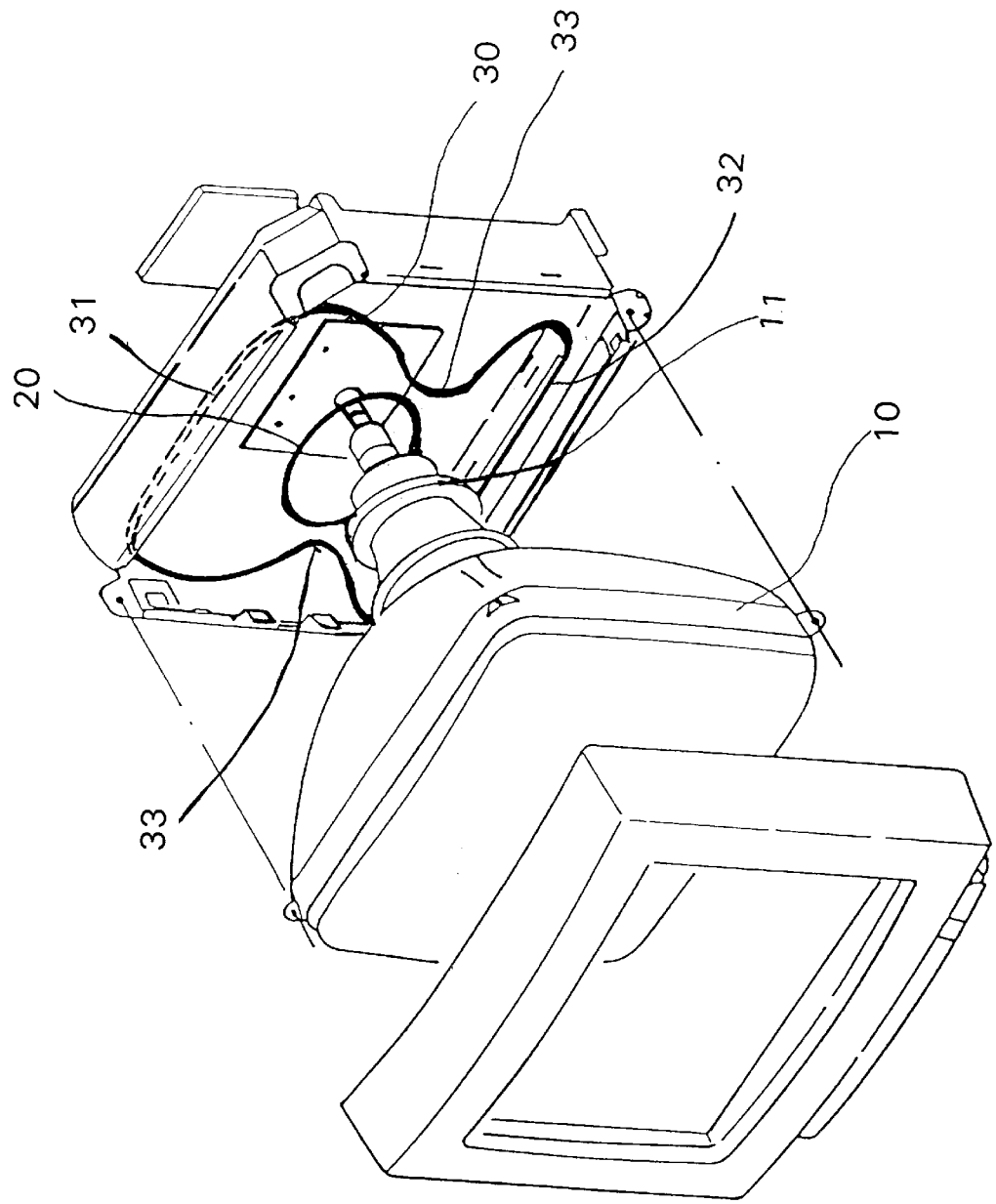
FIG. 8 is an exploded perspective view of the display in which the degaussing coil according to the present invention is set.

FIG. 7 shows a state where the degaussing coil is set in the display according to the present invention. FIG. 8 is an exploded perspective view of the display in which the degaussing coil according to the present invention is set. Referring to FIG. 7, the top 31 of the degaussing coil 30 is fixed onto ears of cathode ray tube 10 (shown in FIG. 3), and its bottom 32 is fixed to catches of the cathode ray tube frame. That is, in order to obtain magnetic field shielding effect required for the display of above 17" as shown in table 2, the form of the degaussing coil of the present invention is changed in such a manner that both sides of its middle portion 33 are bent inward. Accordingly, the secondary magnetic field generated by the deflection yoke and tilt coil 20 does not affect the degaussing coil 30.

The following tables show data obtained when experiments are performed using the display of the present invention. Table 3 shows electric field measurement data, and table 4 shows magnetic field measurement data.

TABLE 3

| | | 64 KHz/60 Hz | | | | 31.7 KHz/60 Hz | | | | |
|---|---|---|---|---|---|---|---|---|---|---|
| | | VLF(2.5V/m) | | | ELF (25 V/m) | VLF(2.5 V/m) | | | | ELF (25 V/m) |
| | Classification | 0° | 90° | 180° | 270° | 0° | 0° | 90° | 180° | 270° | 0° |
| 1 | Before application of present invention | 1.56 | 1.72 | 0.84 | 0.62 | 18.51 | 1.325 | 1.4 | 0.81 | 0.63 | 19.31 |
| | After application of present invention | 1.430 | 1.745 | 0.79 | 0.56 | 19.74 | 1.236 | 1.195 | 0.676 | 0.472 | 18.84 |
| 2 | Before application of present invention | 1.56 | 1.93 | 1.0 | 1.21 | 18.9 | 1.31 | 1.43 | 0.73 | 0.62 | 19.75 |
| | After application of present invention | 1.493 | 1.864 | 0.954 | 1.186 | 19.2 | 1.243 | 1.313 | 0.71 | 0.579 | 18.45 |
| 3 | Before application of present invention | 1.51 | 1.63 | 1.72 | 0.73 | 16.75 | 1.43 | 1.375 | 0.63 | 0.72 | 14.83 |
| | After application of present invention | 1.653 | 1.53 | 0.67 | 0.69 | 15.376 | 1.376 | 1.234 | 0.595 | 0.618 | 13.82 |

Here, 0°, 90°, 180° and 270° indicate the front, left side, back and right side of the display, respectively. When the MPR II measurement is performed, the distance between the measurement apparatus and display is 50 cm.

TABLE 4

| Classification | 0° | 180° |
|---|---|---|
| 1 No application of present invention | 19 nT | 30 nT |
| Application of present invention | 7.83 nT | 14.43 nT |
| 2 No application of present invention | 20 nT | 33 nT |
| Application of present invention | 10.63 nT | 13.43 nT |
| 3 No application of present invention | 14 nT | 37 nT |
| Application of present invention | 8.43 nT | 12.63 nT |

When current is supplied to the degaussing coil of the present invention, the magnetic field formed on the shadow mask of the display is dispersed, so as to recover from the state where color spreads.

The following table shows comparative experiment data of the degaussing capability between the conventional degaussing coil and the degaussing coil of the present invention.

TABLE 5

| Conventional degaussing coil | | Degaussing coil of the present invention | |
| --- | --- | --- | --- |
| East | West | East | West |
| 12/−4 11/−1 10/−1 | 16/2 14/−16 6/−2 | 3/−18 1/−10 5/10 | 9/−10 7/−23 0/−1 |
| 13/2 2/9 −7/−3 | 11/7 1/−6 −8/−3 | 0/−8 −6/7 −10/1 | 0/6 −4/−6 −12/−3 |
| 6/12 −8/25 −10/−3 | 1/17 −8/9 −9/4 | −6/7 −3/26 −17/11 | −16/16 −11/10 −15/13 |

The table 5 shows the tilt of the electron beam when the display is viewed in front. Dark color purity is generated at a pixel which electron beam does not reach in red full pattern under the influence of the magnetic field. In Table 5, the east and west indicate that the display is located to the east and west, respectively. The numbers indicate the form of horizontal/vertical degaussing capability. The nine numerical values in one direction are measured from nine points of a picture. Negative numerals in horizontal show that the electron beam is tilted to the left, and positive numerals in horizontal show that the electron beam is tilted to the right. Negative numerals in vertical show that the electron beam is tilted to the bottom, and positive numerals in vertical show that the electron beam is tilted to the top.

As shown in Table 5, in the conventional degaussing coil, since the magnetic field at the portion where the coil is twisted is stronger, perfect degaussing does not occur. That is, the electron beam does not reach its predetermined location, so that a blurred form, dark color purity, is shown at the lower portion of the display. When degaussing is carried out using the degaussing coil of the present invention however, this dark color purity error is improved.

In the practice of the present invention, the magnetic field can be shielded only using the tilt coil and degaussing coil, without a metal shield. Especially, the form of the degaussing coil is changed from the conventional one, so as to shield the secondary magnetic field generated by the deflection yoke and tilt coil of the cathode ray tube, to thereby satisfy the MPR II. Furthermore, since a separate external metal shield is not used, the number of steps for producing the display is reduced, improving the production efficiency.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A magnetic field shielding device of a cathode ray tube display, comprising:

a degaussing coil for preventing a magnetic field, generated by a voltage supplied to a deflection coil of the display, from being emitted from the display; and a tilt coil disposed at a middle portion of the degaussing coil so as to surround an electron gun of the cathode ray tube, top and bottom portions of the degaussing coil being maintained horizontal, and both sides of its middle portion being bent inward to approach to each other, and having a predetermined distance therebetween, to thereby prevent dark color purity generated at the lower portion of the display.

2. A magnetic field shielding device of a cathode ray tube display, comprising:

a degaussing coil for preventing a magnetic field, generated by a voltage supplied to a deflection coil of the display, from being emitted from the display, said degaussing coil having an hourglass shape with the degaussing coil portions at the narrowest part of the hourglass shape being separated by a predetermined distance and not crossing one another; and an electron gun of the cathode ray tube being disposed within one of the two triangular areas forming the hourglass shape of the degaussing coil.

3. The device as recited in 2, further comprising a tilt coil disposed adjacent to the narrowest portion of the degaussing coil so as to surround the electron gun of the cathode ray tube.

* * * * *